United States Patent
Murata

(10) Patent No.: US 9,543,857 B2
(45) Date of Patent: Jan. 10, 2017

(54) LOAD DRIVING DEVICE WITH FAILURE DETECTION

(71) Applicant: Hiromi Murata, Aichi (JP)

(72) Inventor: Hiromi Murata, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/669,384

(22) Filed: Mar. 26, 2015

(65) Prior Publication Data

US 2015/0280609 A1   Oct. 1, 2015

(30) Foreign Application Priority Data

Mar. 28, 2014  (JP) ................................. 2014-068066

(51) Int. Cl.
*H02H 7/122*   (2006.01)
*H02M 7/537*   (2006.01)
(Continued)

(52) U.S. Cl.
CPC ........... *H02M 7/537* (2013.01); *H02M 7/5387* (2013.01); *H02M 2001/325* (2013.01)

(58) Field of Classification Search
CPC ................ H02M 7/537; H02M 5/5387; H02M 2001/325; H02M 1/32
(Continued)

(56) References Cited

U.S. PATENT DOCUMENTS 5,214,575 A * 5/1993 Sugishima ........... H02H 7/1216
361/42
7,898,782 B2 * 3/2011 Park ..................... H02H 7/1227
361/88

(Continued)

FOREIGN PATENT DOCUMENTS

AU       2009342065 A1    10/2011
DE   10 2009 045 351 A1    4/2011
(Continued)

OTHER PUBLICATIONS

Office Action in counterpart German Patent Application No. 20 2015 205 627.9 issued Nov. 24, 2015 (12 pages).
(Continued)

*Primary Examiner* — Adolf Berhane
*Assistant Examiner* — Alex Torres-Rivera
(74) *Attorney, Agent, or Firm* — Osha Liang LLP

(57) ABSTRACT

A motor driving device includes a failure detector detecting the failure of switching elements and diodes of an inverter circuit. When the failure detection unit detects a failure according to which a switching element of a phase C upper stage is not conducting, but does not detect a failure according to which the diode connected is not conducting, a motor is driven using the switching element paired with the faulty switching element and the switching elements of the other phase. When the failure detection unit detects the failure according to which the switching element of the phase C upper stage is not conducting, and detect the failure according to which the diode connected is not conducting, the switching element paired with the faulty switching element is maintained in an off state, and each of the switching elements of the other phase is on/off controlled.

4 Claims, 15 Drawing Sheets

(51) Int. Cl.
*H02M 7/5387* (2007.01)
*H02M 1/32* (2007.01)

(58) Field of Classification Search
USPC .............................................. 363/50, 55–58
See application file for complete search history.

(56) References Cited

U.S. PATENT DOCUMENTS

| | | | |
|---|---|---|---|
| 2007/0176577 A1 | 8/2007 | Kezobo et al. | |
| 2010/0036555 A1* | 2/2010 | Hosoda | B60L 3/003 701/22 |
| 2010/0060222 A1* | 3/2010 | Kezobo | G01R 31/42 318/490 |
| 2012/0262098 A1 | 10/2012 | Vollmer et al. | |
| 2012/0326644 A1* | 12/2012 | Okumura | B62D 5/0487 318/400.21 |
| 2013/0200827 A1* | 8/2013 | Kezobo | H02P 29/0241 318/400.21 |
| 2013/0285584 A1* | 10/2013 | Kim | H02P 25/08 318/400.21 |
| 2013/0314014 A1* | 11/2013 | Tremel | H02M 7/53871 318/400.22 |
| 2015/0085403 A1* | 3/2015 | Santos | H02P 27/06 361/33 |
| 2015/0280609 A1 | 10/2015 | Murata | |

FOREIGN PATENT DOCUMENTS

| | | |
|---|---|---|
| JP | 2005-094873 A | 4/2005 |
| JP | 2009-071975 A | 4/2009 |
| JP | 2010-000826 A | 1/2010 |
| WO | 2005/091488 A1 | 9/2005 |

OTHER PUBLICATIONS

A.O. Di Tommaso et al; "Experimental Validation of a General Model for Three Phase Inverters Operating in Healthy and Faulty Modes"; International Symposium on Power Electronics, Electrical Drives, Automation and Motion 2012; pp. 50-55; Jun. 20-22, 2012 (6 pages).

* cited by examiner

Phase C upper stage abnormality (complete off failure)
 Q5: Non-conducting
 D5: Non-conducting Phase C upper stage abnormality (incomplete off failure)
 Q5: Non-conducting
 D5: Conducting Phase A lower stage abnormality
(complete off failure)
 Q2: Non-conducting
 D2: Non-conducting Phase A lower stage abnormality
(incomplete off failure)
 Q2: Non-conducting
 D2: Conducting

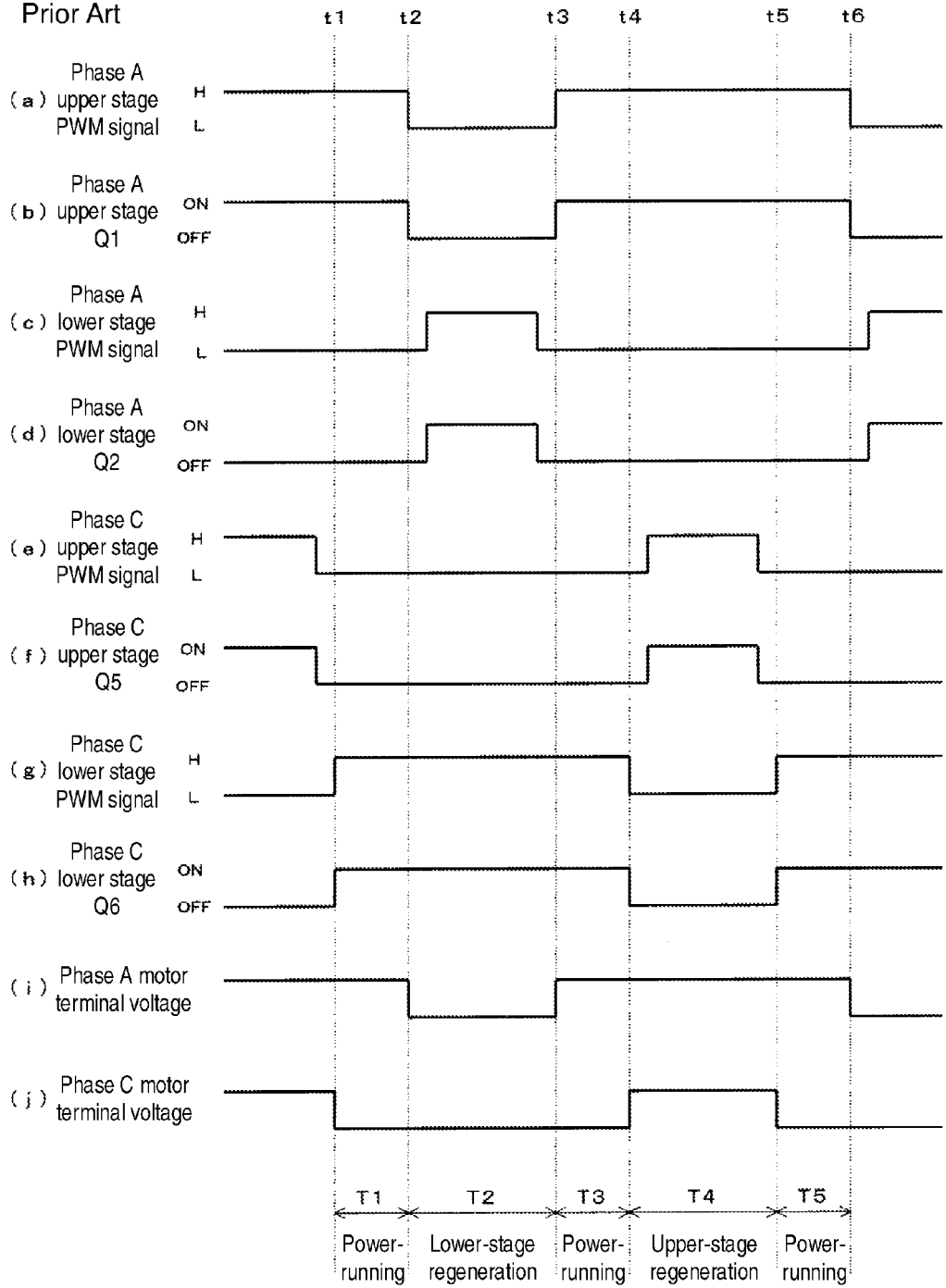

Power-running (T1)

Lower-stage regeneration (T2)

Power-running (T3)

Upper-stage regeneration (T4)

US 9,543,857 B2

LOAD DRIVING DEVICE WITH FAILURE DETECTION

CROSS-REFERENCE TO RELATED APPLICATION

This application is based on Japanese Patent Application No. 2014-068066 filed with the Japan Patent Office on Mar. 28, 2014, the entire contents of which are incorporated herein by reference.

FIELD

The disclosure relates to a device for driving a load such as a motor. More particularly, the disclosure relates to a load driving device provided with an inverter circuit for supplying a current to the load by an on/off operation of a switching element.

BACKGROUND

For example, with an electric power steering device mounted in a vehicle, an electric motor such as a three-phase brushless motor is provided to give steering assist force according to steering torque of a handle to a steering mechanism. As a device for driving this motor, a motor driving device according to a PWM (Pulse Width Modulation) control method has been known.

Generally, the motor driving device according to the PWM control method is provided with an inverter circuit driven by a PWM signal with a predetermined duty. The inverter circuit is formed from a bridge circuit including pairs of upper and lower arms where the number of pairs corresponds to the number of phases and where a switching element is provided to each of the upper and lower arms. A current is supplied from a power source to the motor via the inverter circuit and the motor is driven by the on/off operation of each switching element that is based on the PWM signal.

With such a motor driving device, a general control method is to stop the driving of the motor when an abnormality occurs in any of the phases of the inverter circuit due to a failure of a switching element. However, in the case of an electric power steering device, if the motor is stopped immediately at the time of occurrence of an abnormality, the steering assist force suddenly becomes unobtainable, and operation is adversely affected. Thus, motor driving devices allowing continuation of driving of the motor even when a failure of the switching element of any phase occurs are being proposed (for example, JP 2010-826 A, JP 2005-94873 A, JP 2009-71975 A, and WO 2005/091488 A).

According to JP 2010-826 A, a faulty switching element is identified at the time of occurrence of an energizing failure, and a rotational angle range where the energizing failed phase may be energized via a switching element forming a pair with the faulty switching element is identified. Then, driving of the motor is continued by supplying a sine wave current to each phase within the rotational angle range.

According to JP 2005-94873 A, in the event of an open failure (failure during an off state) of a switching element, vector control with a fixed composite voltage vector is performed even in a region where a faulty switching element is used to thereby continue driving of the motor.

According to JP 2009-71975 A, in the case where a failure of a switching element is detected, driving of the motor is continued by operating remaining operating switching elements in such a way that each of the waveforms of output currents of two phases comes close to a sine wave.

According to WO 2005/091488 A, in the event of an occurrence of an abnormality such as disconnection of one phase, target current values of normal two phases are calculated, and a voltage command value generated based on these target current values is given to an inverter drive circuit, to thereby continue driving of the motor.

For example, regarding a three-phase inverter circuit having six switching elements, if one of upper and lower switching elements of one phase fails, there are conceivable a method of continuing driving of the motor using only the four switching elements of the remaining two phases (hereinafter referred to as a "two-phase method"), and a method of continuing driving of the motor using, in addition to the four switching elements, the one normal switching element of the faulty phase (hereinafter referred to as "quasi three-phase method"). JP 2010-826 A, JP 2005-94873 A, and JP 2009-71975 A are examples of the quasi three-phase method, and WO 2005/091488 A is an example of the two-phase method. In the case of the two-phase method, the entire phase where a failure has occurred is separated, but in the case of the quasi three-phase method, only the faulty switching element is separated. The quasi three-phase method has an advantage that the steering performance is improved because there are less ripple components in the motor current compared to the two-phase method.

FIG. 10 shows an example of a conventional motor driving device used for an electric power steering device. A motor driving device 200 includes an inverter circuit 10, a drive circuit 20, and a controller 30. A motor M is an assist motor for providing steering assist force. A power source Vd is a DC power source to be supplied by a battery mounted in a vehicle.

The inverter circuit 10 is formed from a three-phase bridge circuit including six switching elements Q1 to Q6. The switching elements Q1 to Q6 are formed from FETs (field effect transistors), and include diodes D1 to D6, respectively. These diodes D1 to D6 are parasitic diodes between drains and sources of the FETs, and are connected in parallel to the switching elements Q1 to Q6, in opposite direction with respect to the power source Vd (positive terminal). Each of the connection points between the upper switching elements Q1, Q3, and Q5 and the lower switching elements Q2, Q4, and Q6 is connected to the motor M via an electrical path. A current sensing resistor Rs for sensing a current flowing through the motor M is provided between a ground G and the switching elements Q2, Q4, and Q6.

The controller 30 calculates the duty of the PWM signal for driving the switching elements Q1 to Q6 based on a difference between the value of a motor current sensed by the current sensing resistor Rs and a target current value calculated from a steering torque value detected by a torque sensor not shown. The drive circuit 20 generates six types of PWM signals based on the value of duty given by the controller 30, and applies each PWM signal to each of the gates of the switching elements Q1 to Q6. The inverter circuit 10 operates by the switching elements Q1 to Q6 being switched on/off by the PWM signals, and a current is supplied to the motor M from the power source Vd via the inverter circuit 10.

FIG. 11 is a time chart showing the operation of the inverter circuit 10. (a) and (b) show a PWM signal given to the switching element Q1 of a phase A upper stage and an operation of the switching element Q1, (c) and (d) show a PWM signal given to the switching element Q2 of a phase A lower stage and an operation of the switching element Q2, (e) and (f) show a PWM signal given to the switching element Q5 of a phase C upper stage and an operation of the switching element Q5, (g) and (h) show a PWM signal given to the switching element Q6 of a phase C lower stage and an operation of the switching element Q6, (i) shows motor terminal voltage of the phase A, and (j) shows motor terminal voltage of the phase C. With respect to the PWM signal, "H" indicates a high level, and "L" indicates a low level. Moreover, to simplify the description, a phase B is omitted from the drawing.

In FIG. 11, a section T1 between time t1 and t2 is a power-running section. In this section T1, the switching elements Q1 and Q6 are switched to an on state as shown in (b) and (h), and the switching elements Q2 and Q5 are switched to an off state as shown in (d) and (f), and thus, a current flows from the power source Vd to the motor M by a path shown by the dashed line in FIG. 12A.

A section T2 between time t2 and t3 is a lower-stage regeneration section. In this section T2, the switching elements Q2 and Q6 are switched to the on state as shown in (d) and (h), and the switching elements Q1 and Q5 are switched to the off state as shown in (b) and (f), and thus, a regenerative current based on discharge of energy stored in an inductance of the motor M flows through a path shown by the dashed line in FIG. 12B.

A section T3 between time t3 and t4 is again a power-running section, and the switching elements Q1 and Q6 are switched to the on state as shown in (b) and (h), and the switching elements Q2 and Q5 are switched to the off state as shown in (d) and (f), and thus, a current flows from the power source Vd to the motor M by a path shown by the dashed line in FIG. 12C (which is the same as that in FIG. 12A).

A section T4 between time t4 and t5 is an upper-stage regeneration section. In this section T4, the switching elements Q1 and Q5 are switched to the on state as shown in (b) and (f), and the switching elements Q2 and Q6 are switched to the off state as shown in (d) and (h), and thus, a regenerative current based on discharge of energy stored in the inductance of the motor M flows through a path shown by the dashed line in FIG. 12D.

A section T5 between time t5 and t6 is again a power-running section, and the same patterns as those of the sections T1 to T4 are repeated thereafter.

A failure where one of the switching elements Q1 to Q6 of the inverter circuit 10 as described above is fixed to the off (non-conducting) state and would not be switched on (conducting) sometimes occurs. This failure is referred to as an "off failure" in this specification (the "open failure" in JP 2005-94873 A is used synonymously).

In the case where six switching elements Q1 to Q6 to which diodes D1 to D6 are connected in parallel are used, as in FIG. 10, there are two types of off failures. One is a failure where both the switching element and the diode would not conduct (hereinafter referred to as a "complete off failure"). This is a failure that occurs when disconnection occurs on the drain side or the source side of the FET, and both the switching element and the diode are cut off, for example. The other is a failure where the diode is normal, and only the switching element would not conduct (hereinafter referred to as an "incomplete off failure"). This is a failure that occurs when the gate of the FET is shunted to the ground, or the FET itself is broken, for example.

FIG. 13 shows a state at the time of upper-stage regeneration where there is an occurrence of the "complete off failure" at the phase C upper stage of the inverter circuit 10. At this time, the switching element Q5 is in the abnormal (non-conducting) state, and a regenerative current cannot flow through the inverter circuit 10 via the switching element Q5. Since the diode D5 is also in the abnormal (non-conducting) state, the regenerative current cannot flow through the inverter circuit 10 via the diode D5 either.

FIG. 14 shows a state at the time of upper-stage regeneration where there is an occurrence of the "incomplete off failure" at the phase C upper stage of the inverter circuit 10. At this time, the switching element Q5 is in the abnormal (non-conducting) state, and a regenerative current cannot flow through the inverter circuit 10 via the switching element Q5. However, the diode D5 is normal, and the regenerative current flows through the inverter circuit 10 via the diode D5 by a path as shown by the dashed line.

In a state where there is an occurrence of a complete off failure at the phase C upper stage, as in FIG. 13, surge voltage in the positive direction occurs in the motor terminal voltage of the phase C (the voltage at the connection point of the switching elements Q5, Q6) at the timing of switching from the power-running state to the upper-stage regeneration state (time t4). This is because the energy stored in the inductance of the motor M appears as the surge voltage without being absorbed as the regenerative current at the moment of switching off of the switching element Q6 (normal) of the phase C lower stage at time t4. When the voltage value of this surge voltage exceeds the withstand voltage of the switching element Q6, the switching element Q6 is destroyed.

Accordingly, even if there is an attempt to perform driving by the quasi three-phase method described above by switching on/off the normal switching element Q6 of the phase C lower stage in a state where there is a complete off failure at the phase C upper stage, driving by the quasi three-phase method is impossible when the switching element Q6 is destroyed. In this case, switching to driving by the two-phase method has to be performed, but conventionally, there has been no means for determining which of the quasi three-phase method and the two-phase method should be adopted.

On the other hand, in a case where the phase C upper stage is in the state of an incomplete off failure, a regenerative current flows at the time of upper-stage regeneration, and no surge voltage occurs in the motor terminal voltage of the phase C. Therefore, driving by the two-phase method by completely separating the phase C without switching on/off the switching element Q6 of the phase C lower stage is not only pointless, but also undesirable because the ripple components in the motor current would be increased compared to the quasi three-phase method.

FIG. 16 shows a state at the time of lower-stage regeneration where there is an occurrence of the "complete off failure" at the phase A lower stage of the inverter circuit 10. At this time, since the switching element Q2 is in an abnormal (non-conducting) state, a regenerative current cannot flow through the inverter circuit 10 via the switching element Q2. Since the diode D2 is also in the abnormal (non-conducting) state, the regenerative current cannot flow through the inverter circuit 10 via the diode D2.

FIG. 17 shows a state at the time of lower-stage regeneration where there is an occurrence of the "incomplete off failure" at the phase A lower stage of the inverter circuit 10. At this time, since the switching element Q2 is in an abnormal (non-conducting) state, a regenerative current cannot flow through the inverter circuit 10 via the switching element Q2. However, the diode D2 is normal, and the regenerative current flows through the inverter circuit 10 via the diode D2 by a path as shown by the dashed line.

In a state where there is an occurrence of a complete off failure at the phase A lower stage, as in FIG. 16, surge voltage in the negative direction occurs in the motor terminal voltage of the phase A (the voltage at the connection point of the switching elements Q1, Q2) at the timing of switching from the power-running state to the lower-stage regeneration state (time t2). This is because the energy stored in the inductance of the motor M appears as the surge voltage without being absorbed as the regenerative current at the moment of switching off of the switching element Q1 (normal) of the phase A upper stage at time t2. The source potential of the switching element Q1 is lowered by this surge voltage in the negative direction, and as a result, the switching element Q1 falls into a semi-on state (an intermediate state between on and off). Thus, a large current based on the surge voltage flows to the power source Vd side via the switching element Q1, and when power loss (heating) due to this large current becomes excessive, the switching element Q1 is destroyed.

Accordingly, even if there is an attempt to perform driving by the quasi three-phase method described above by switching on/off the normal switching element Q1 of the phase A upper stage in a state where there is a complete off failure at the phase A lower stage, driving by the quasi three-phase method is impossible when the switching element Q1 is destroyed. Also in this case, switching to driving by the two-phase method has to be performed, but conventionally, there has been no means for determining which of the quasi three-phase method and the two-phase method should be adopted.

On the other hand, in a case where the phase A lower stage is in the state of an incomplete off failure, a regenerative current flows at the time of lower-stage regeneration, and no surge voltage occurs in the motor terminal voltage of the phase A. Therefore, driving by the two-phase method by completely separating the phase A without switching on/off the switching element Q1 of the phase A upper stage is not only pointless, but also undesirable because the ripple components in the motor current would be increased compared to the quasi three-phase method.

SUMMARY

One or more embodiments of the disclosure provide a load driving device capable of continuously driving a load, in the event of a failure of a switching element of an inverter circuit, by appropriate control according to the mode of the failure.

A load driving device according to one or more embodiments of the disclosure includes an inverter circuit, a controller, and a failure detection unit. The inverter circuit includes a pair of upper and lower arms provided to each phase of three or more multiple phases. A switching element is provided to each of the upper arm and the lower arm of each phase. A diode is connected in parallel to the each switching element in an opposite direction with respect to a power source. The controller is configured to control on/off of each switching element. With the switching element being switched on/off, a current is supplied to a load from the power source via the inverter circuit. The failure detection unit detects a failure of the switching element, and a failure of the diode that is connected in parallel to the switching element.

When the failure detection unit detects a failure according to which a switching element provided to one of the upper and lower arms of a certain phase is not conducting, but does not detect a failure according to which the diode connected in parallel to the switching element is not conducting, the controller performs on/off control for a switching element, of the certain phase, which is paired with the faulty switching element and each switching element of other phases. This case corresponds to the "incomplete off failure" described above, and in the case of three phases, load driving by the "quasi three-phase method" described above is performed by using the switching elements of the normal two phases and the normal switching element of the phase where a failure has occurred.

On the other hand, when the failure detection unit detects a failure according to which a switching element provided to one of the upper and lower arms of a certain phase is not conducting, and detects a failure according to which the diode connected in parallel to the switching element is not conducting, the controller maintains a switching element, of the certain phase, which is paired with the faulty switching element in an off state, and performs on/off control for each switching element of other phases. This case corresponds to the "complete off failure" described above, and in the case of three phases, load driving by the "two-phase method" described above is performed by using only the switching elements of the normal two phases.

As described above, in the case where an off failure which has occurred at a certain phase is the "complete off failure", even if a normal switching element of the faulty phase is destroyed, the load may be continued to be driven by the remaining phases by separating the whole of the faulty phase. Also, in the case the off failure is the "incomplete off failure", the load may be continued to be driven while suppressing an increase in the ripple components in the load current by separating only the faulty switching element. In this manner, driving of the load may be continued by appropriate control according to the type of the failure of the switching element.

In one or more embodiments of the disclosure, a first voltage sensing unit configured to sense terminal voltage of the load may be provided. In this case, the failure detection unit determines whether voltage sensed by the first voltage sensing unit at a timing of switching of the inverter circuit from a power-running state to a regeneration state is surge voltage exceeding threshold voltage or not. Then, in the case where the voltage is the surge voltage, the failure detection unit determines that the switching element and the diode that is connected in parallel to the switching element are both faulty.

In one or more embodiments of the disclosure, in a case where the number of times of determination that the terminal voltage of the load sensed at the timing is the surge voltage reaches a predetermined continuous number of times, the failure detection unit may determine that the switching element and the diode that is connected in parallel to the switching element are both faulty.

In one or more embodiments of the disclosure, a second voltage sensing unit configured to detect voltage across both ends of the switching element may be provided. In this case, in a case where voltage across both ends of the switching element sensed by the second voltage sensing unit in a state where on control is being performed by the controller for the switching element is a predetermined value or higher, the failure detection unit determines that the switching element is faulty.

According to one or more embodiments of the disclosure, there may be provided a load driving device capable of continuously driving a load, in the event of a failure of a switching element of an inverter circuit, by appropriate control according to the mode of the failure.

BRIEF DESCRIPTION OF THE DRAWINGS

FIG. 11 is a time chart showing an operation of the motor driving device in FIG. 10;

DETAILED DESCRIPTION

Figure 1:
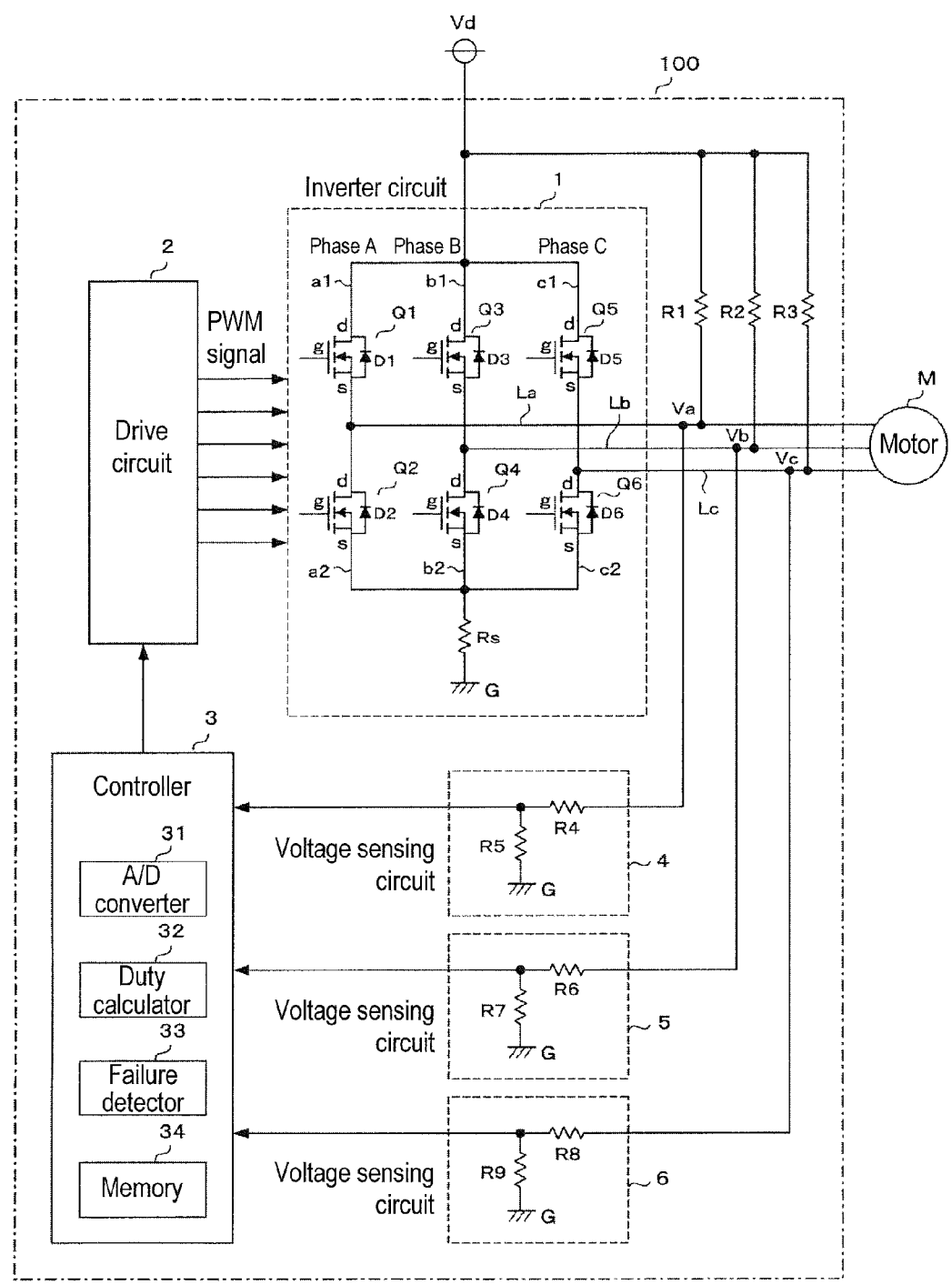
FIG. 1 is a circuit diagram of a motor driving device according to one ore more embodiments of the disclosure.

Embodiments of the disclosure will be described with reference to the drawings. In the drawings, the same or corresponding parts are denoted by the same reference sign. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. In the following, a motor driving device used for an electric power steering device of a vehicle is cited as an example of a load driving device.

First, the structure of a motor driving device will be described with reference to FIG. 1. In FIG. 1, a motor driving device 100 is provided with an inverter circuit 1, a drive circuit 2, a controller 3, voltage sensing circuits 4, 5 and 6, and resistors R1, R2 and R3. A motor M is an assist motor providing steering assist force, and is a three-phase brushless motor, for example. A power source Vd for supplying power to the motor M is a DC power source to be supplied by a battery mounted in a vehicle.

The inverter circuit 1 is formed from a three-phase bridge circuit having a switching element provided to each of a pair of upper and lower arms of each phase. Specifically, a switching element Q1 is provided to an upper arm a1 of a phase A, and a switching element Q2 is provided to a lower arm a2 of the phase A. A switching element Q3 is provided to an upper arm b1 of a phase B, and a switching element Q4 is provided to a lower arm b2 of the phase B. A switching element Q5 is provided to an upper arm c1 of a phase C, and a switching element Q6 is provided to a lower arm c2 of the phase C.

The switching elements Q1 to Q6 are formed from n-channel MOS-FETs, and include diodes D1 to D6, respectively. These diodes D1 to D6 are parasitic diodes between drains d and sources s of the FETs, and are connected in parallel to the switching elements Q1 to Q6, in opposite direction with respect to a power source Vd (positive terminal). Each of the connection points between the switching element Q1, Q3, and Q5 provided to the upper arms a1, b1, and c1 and the switching elements Q2, Q4, and Q6 provided to the lower arms a2, b2, and c2 is connected to the motor M via an electrical path La, Lb, or Lc.

A current sensing resistor Rs for sensing a current flowing through the motor M (a motor current) is provided between a ground G and the switching elements Q2, Q4, and Q6. Voltage across both ends of the current sensing resistor Rs caused by the motor current is input to the controller 3 via an operational amplifier or the like not shown.

The controller 3 is formed from a microcomputer, and is provided with an A/D converter 31, a duty calculator 32, a failure detector 33, and a memory 34. The A/D converter 31 converts analog values of voltage input to the controller 3 and other physical quantities into digital values. The duty calculator 32 calculates the duty of a PWM signal for driving the switching elements Q1 to Q6 based on a difference between the value of a motor current sensed by the current sensing resistor Rs and a target current value calculated from a steering torque value detected by a torque sensor not shown. The failure detector 33 detects a failure of the switching elements Q1 to Q6 and the diodes D1 to D6 based on voltage sensed by the voltage sensing circuits 4, 5, and 6, and a voltage sensing circuit 7 described later (FIG. 9) (details will be given later). The memory 34 stores a threshold value and the like for failure determination by the failure detector 33.

The drive circuit 2 generates six types of PWM signals based on the value of duty given by the controller 3, and applies each PWM signal to each gate g of the switching elements Q1 to Q6. The switching elements Q1 to Q6 are switched on in a section where the level of the PWM signal is "H" (High), and the switching elements Q1 to Q6 are switched off in a section where the level of the PWM signal is "L" (Low). The inverter circuit 1 operates by the switching elements Q1 to Q6 being switched on/off by the PWM signals, and a current is supplied to the motor M from the power source Vd via the inverter circuit 1.

The voltage sensing circuits 4 to 6 sense the terminal voltage of respective phases of the motor M. Specifically, the voltage sensing circuit 4 is formed from resistors R4 and R5 forming a voltage dividing circuit, and senses motor terminal voltage Va (voltage across the electrical path La) of the phase A. The voltage sensing circuit 5 is formed from resistors R6 and R7 forming a voltage dividing circuit, and senses motor terminal voltage Vb (voltage across the electrical path Lb) of the phase B. The voltage sensing circuit 6 is formed from resistors R8 and R9 forming a voltage dividing circuit, and senses motor terminal voltage Vc (voltage across the electrical path Lc) of the phase C. Additionally, the resistance values of the resistors R4 to R9 are sufficiently greater compared to the internal resistance value of the motor M.

The resistors R1, R2, and R3 are pull-up resistors, and are connected between the power source Vd and the respective electrical paths La, Lb, and Lc. The resistance values of these resistors R1 to R3 are also sufficiently greater compared to the internal resistance value of the motor M.

In the configuration described above, the voltage sensing circuits 4, 5, and 6 are examples of a "first voltage sensing unit" of the present invention. The failure detector 33 is an example of a "failure detection unit" of the present invention. The motor M is an example of a "load" of the present invention.

Next, an operation of the motor driving device 100 described above will be described. Operations in cases where the switching elements Q1 to Q6 and the diodes D1 to D6 of the inverter circuit 1 have not failed are the same as those in FIG. 11 and FIGS. 12A to 12D, and description thereof is omitted. In the following, an operation in a case where a failure occurs will be described. (Additionally, a detection method of a failure will be described later.)

Figure 2:
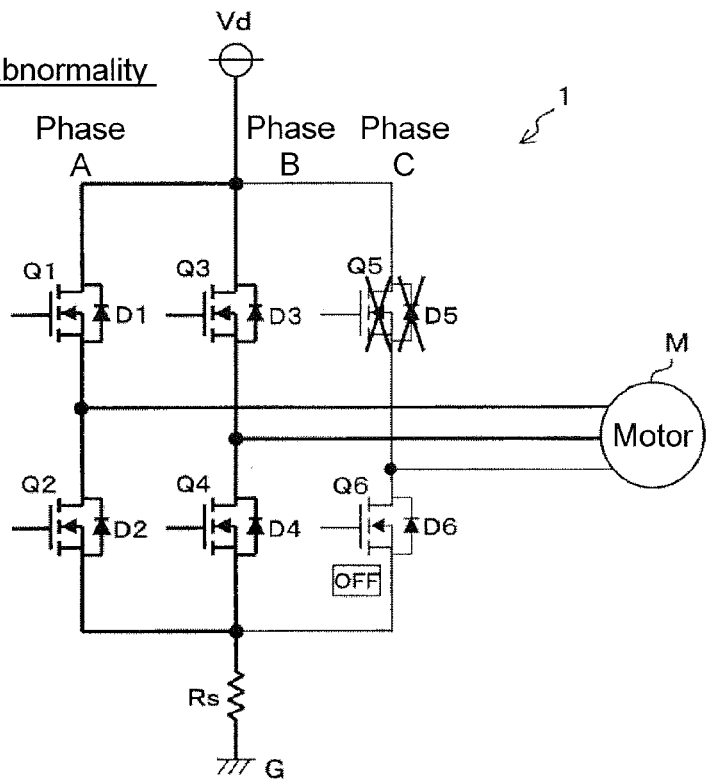
FIG. 2 is a diagram showing the state of an inverter circuit in a case where a complete off failure occurs at a phase C upper stage.
Figure 4:
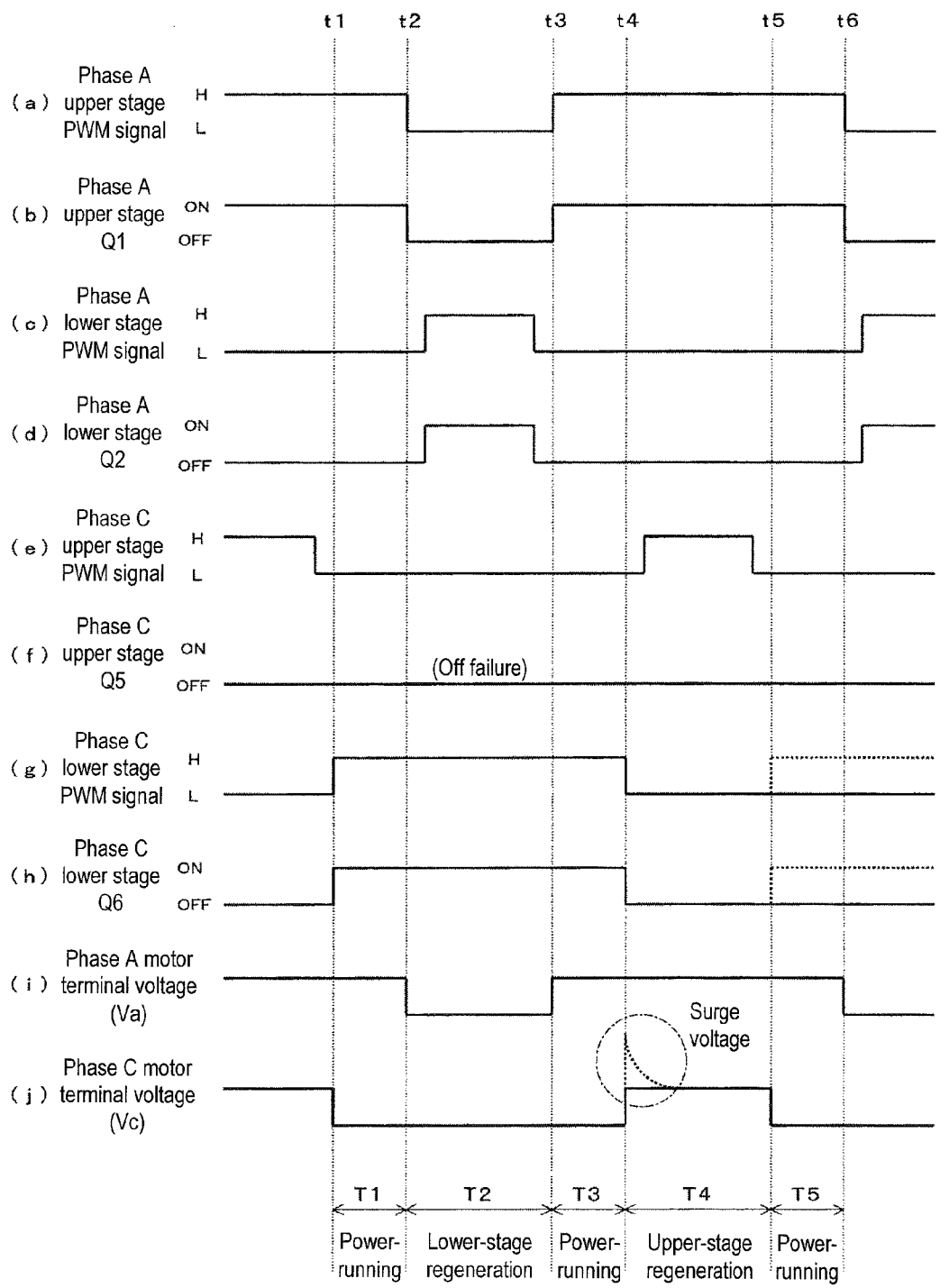
FIG. 4 is a time chart in a case where a surge occurs in a motor terminal voltage of the phase C in the state in FIG. 2.
Figure 13:
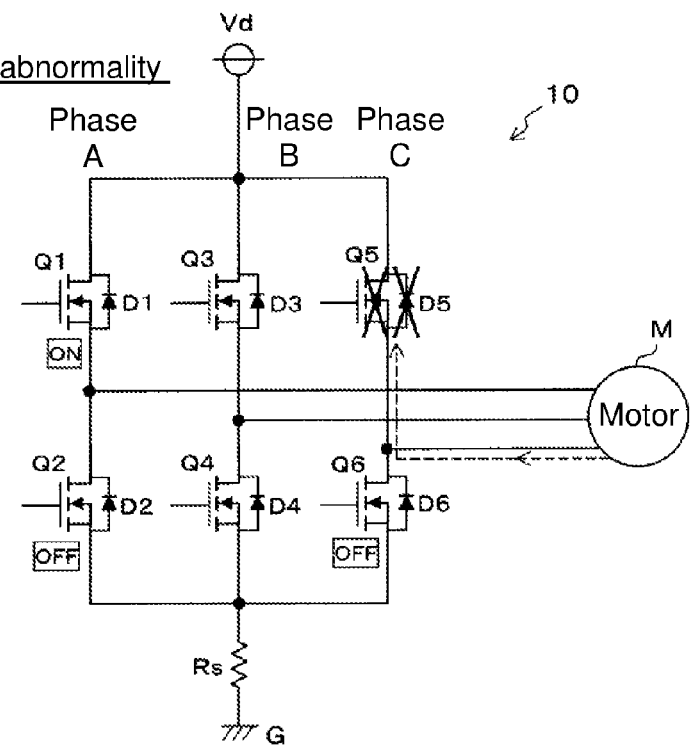
FIG. 13 is a diagram showing a path of a regenerative current in a case where a complete off failure occurs at the phase C upper stage.

FIG. 2 shows the state of the inverter circuit 1 in a case where a "complete off failure" occurs at the phase C upper stage. As has been described with reference to FIG. 13, in this case, both the switching element Q5 and the diode D5 are in an abnormal (non-conducting) state, and thus, a regenerative current cannot flow through the inverter circuit 1 at the time of upper-stage regeneration. Then, surge voltage in the positive direction occurs in the motor terminal voltage of the phase C at the timing of switching from the power-running state to the upper-stage regeneration state (time t4), as shown by the dashed line in FIG. 4(j). When the voltage value of this surge voltage exceeds the withstand voltage of the switching element Q6, the switching element Q6 is destroyed.

Accordingly, in the case shown in FIG. 2, the switching element Q6 of the phase C lower stage, which is paired with the switching element Q5 of the phase C upper stage where a failure has occurred, is maintained in the off state. Specifically, as shown in FIG. 4(g), the PWM signal of the phase C lower stage is kept at "L" without being changed to "H" (or the PWM signal itself is stopped) at the timing of switching from the upper-stage regeneration state to the power-running state (time t5), and as shown in FIG. 4(h), the switching element Q6 is maintained in the off state. On the other hand, with respect to the switching elements Q1 to Q4 of the phase A and the phase B where a failure has not occurred, the on/off control by the PWM signals is continued. Accordingly, in FIG. 2, the entire phase C (the switching elements Q5 and Q6) where a failure has occurred is separated, and motor driving by the "two-phase method" described above is performed using the switching elements Q1 to Q4 of the phase A and the phase B. Then, driving of the motor M may be continued even when the switching element Q6 is destroyed due to the surge voltage.

Figure 3:
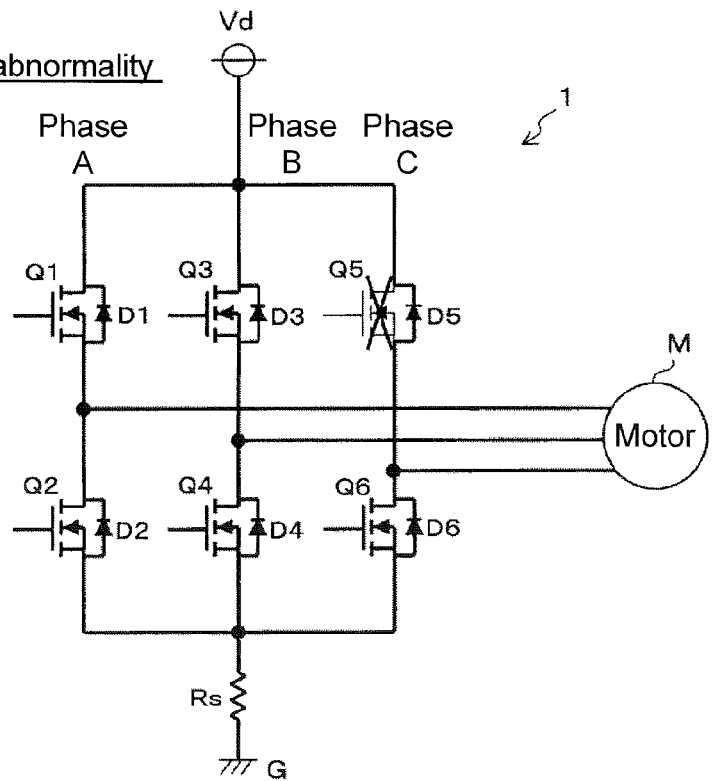
FIG. 3 is a diagram showing the state of the inverter circuit in a case where an incomplete off failure occurs at the phase C upper stage.
Figure 14:
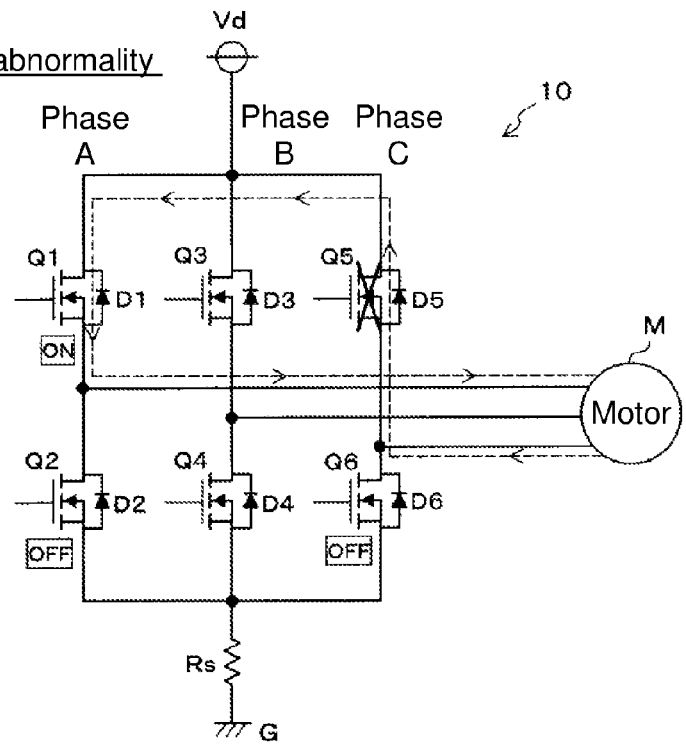
FIG. 14 is a diagram showing a path of a regenerative current in a case where an incomplete off failure occurs at the phase C upper stage.
Figure 15:
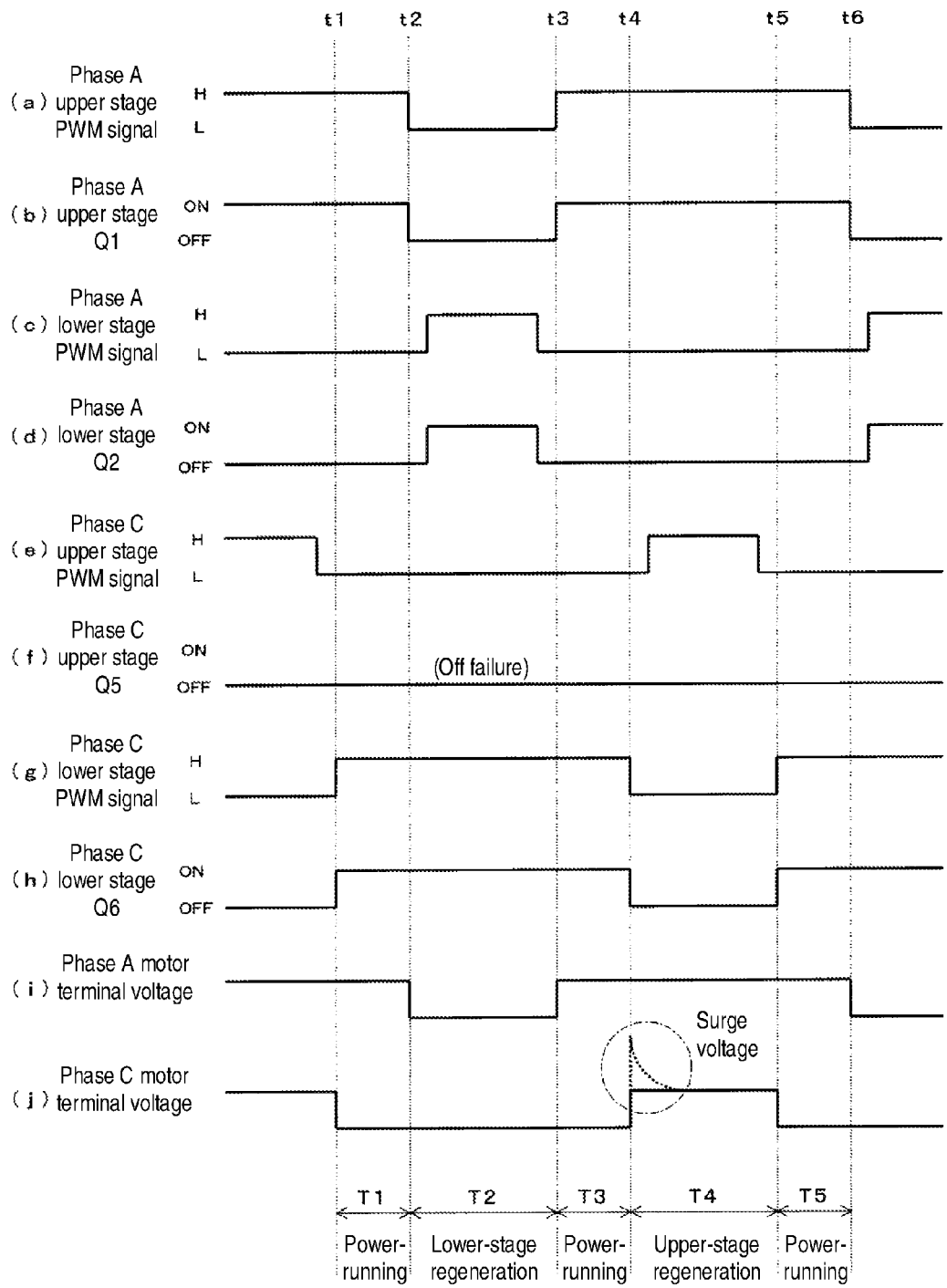
FIG. 15 is a time chart in a case where a surge occurs in a motor terminal voltage of the phase C in the state in FIG. 13.

FIG. 3 shows the state of the inverter circuit 1 in a case where an "incomplete off failure" occurs at the phase C upper stage. As has been described with reference to FIG. 14, in this case, only the switching element Q5 is in the abnormal (non-conducting) state and the diode D5 is normal, and thus, a regenerative current flows through the inverter circuit 1 at the time of upper-stage regeneration. Accordingly, there is no occurrence of the surge voltage shown in FIG. 4(j), and there is no risk of the switching element Q6 being destroyed.

Accordingly, in the case shown in FIG. 3, the switching element Q6 of the phase C lower stage, which is paired with the switching element Q5 of the phase C upper stage where a failure has occurred, is not maintained in the off state, and the on/off control is normally performed. Specifically, as shown in FIG. 4(g), the PWM signal of the phase C lower stage is changed to "H" as shown by the dashed line and the switching element Q6 is switched on as shown by the dashed line in FIG. 4(h) at the timing of switching from the upper-stage regeneration state to the power-running state (time t5). Application of the PWM signal to the switching element Q6 is continued thereafter, and the on/off control is performed for the switching element Q6. On the other hand, with respect to the switching elements Q1 to Q4 of the phase A and the phase B where a failure has not occurred, the on/off control by the PWM signals is continued. Accordingly, in FIG. 3, only the switching element Q5 of the phase C upper stage where a failure has occurred is separated, and motor driving by the "quasi three-phase method" described above is performed using the switching element Q6 of the phase C lower stage, which is paired with the switching element Q5, and the switching elements Q1 to Q4 of the phase A and the phase B. Driving of the motor M may thus be continued while suppressing the ripple components in the motor current.

Figure 5:
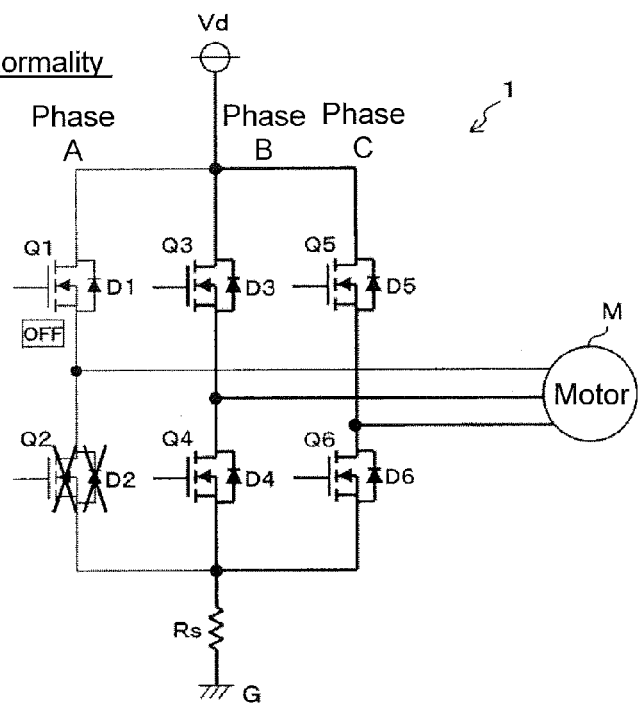
FIG. 5 is a diagram showing the state of the inverter circuit in a case where a complete off failure occurs at a phase A lower stage.
Figure 7:
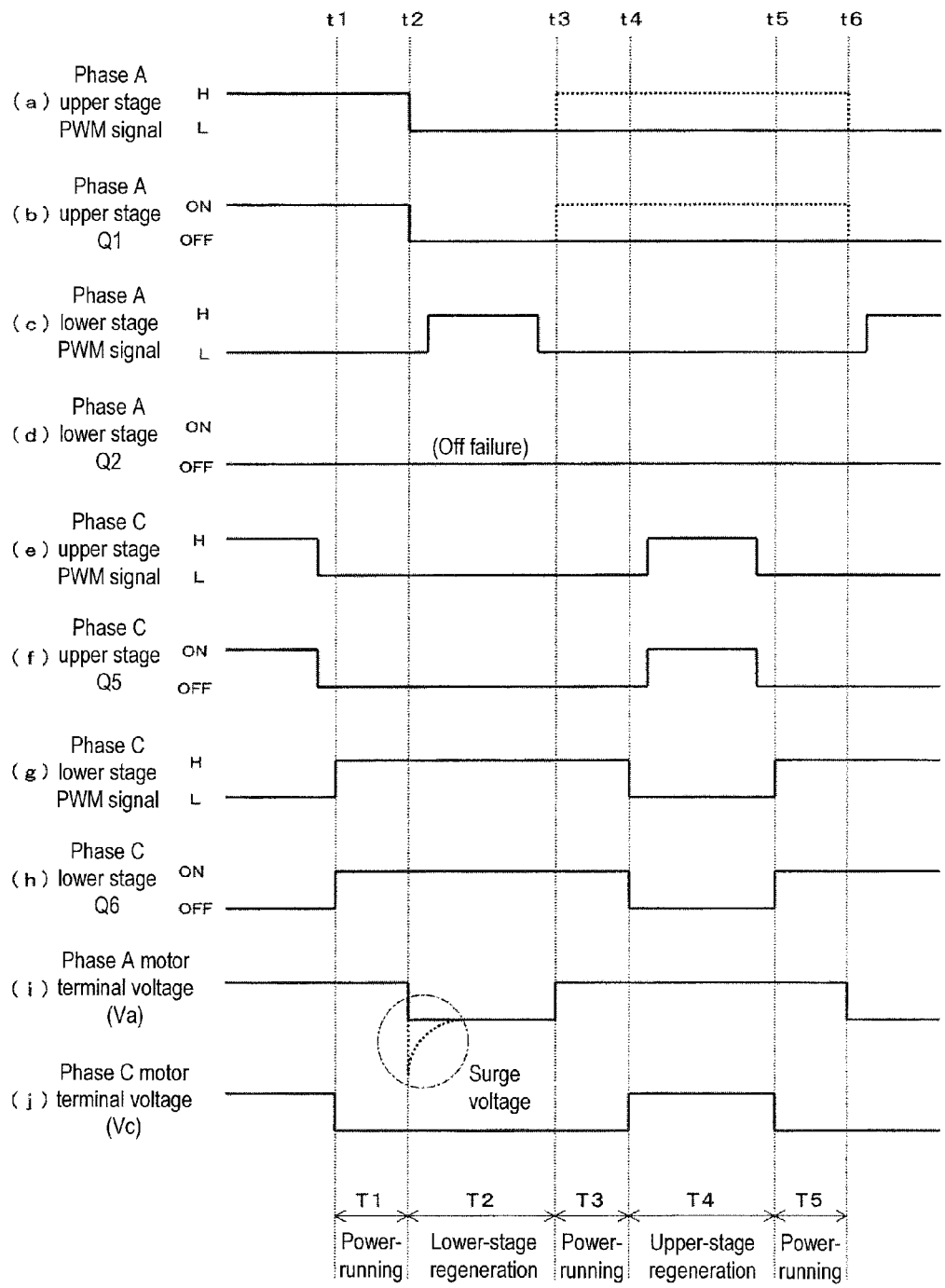
FIG. 7 is a time chart in a case where a surge occurs in a motor terminal voltage of the phase A in the state in FIG. 5.
Figure 16:
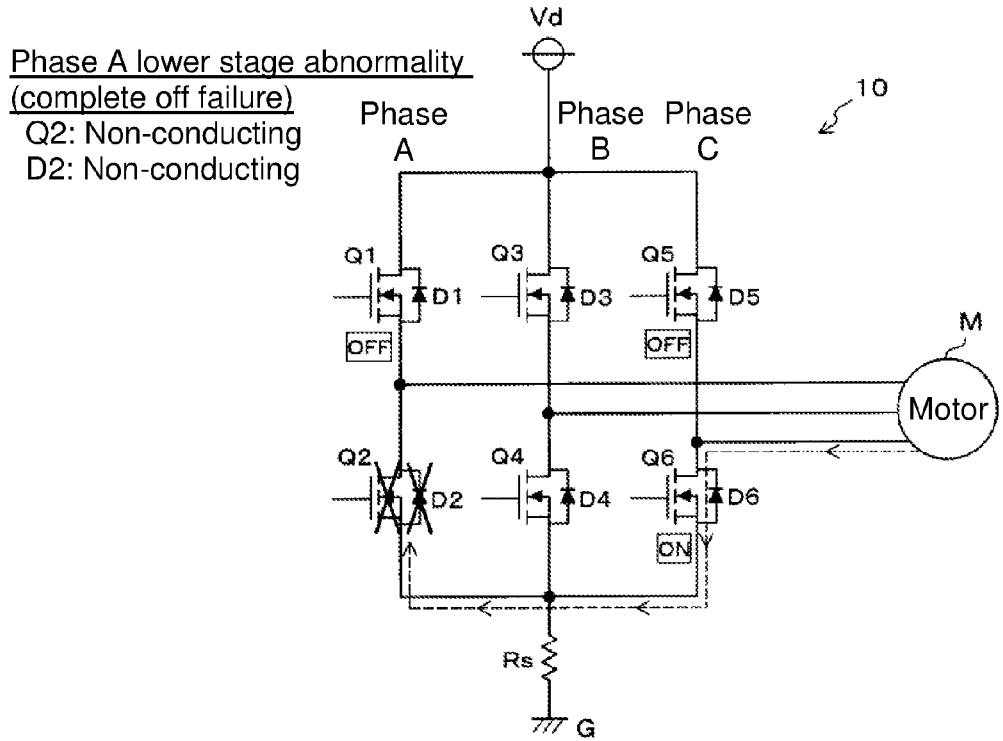
FIG. 16 is a diagram showing a path of a regenerative current in a case where a complete off failure occurs at a switching element of the phase A lower stage.

FIG. 5 shows the state of the inverter circuit 1 in a case where a "complete off failure" occurs at the phase A lower stage. As has been described with reference to FIG. 16, in this case, both the switching element Q2 and the diode D2 are in the abnormal (non-conducting) state, and thus, a regenerative current cannot flow through the inverter circuit 1 at the time of lower-stage regeneration. Then, as shown by the dashed line in FIG. 7(i), surge voltage in the negative direction occurs in the motor terminal voltage of the phase A at the timing of switching from the power-running state to the lower-stage regeneration state (time t2). As a result, the switching element Q1 has the source potential lowered and falls into a semi-on state, and when a large current due to the surge voltage flows through the switching element Q1, the switching element Q1 is destroyed.

Accordingly, in the case shown in FIG. 5, the switching element Q1 of the phase A upper stage, which is paired with the switching element Q2 of the phase A lower stage where a failure has occurred, is maintained in the off state. Specifically, as shown in FIG. 7(a), the PWM signal of the phase A upper stage is kept at "L" without being changed to "H" (or the PWM signal itself is stopped) at the timing of switching from the lower-stage regeneration state to the power-running state (time t3), and as shown in FIG. 7(b), the switching element Q1 is maintained in the off state. On the other hand, with respect to the switching elements Q3 to Q6 of the phase B and the phase C where a failure has not occurred, the on/off control by the PWM signals is continued. Accordingly, in FIG. 5, the entire phase A (the switching elements Q1 and Q2) where a failure has occurred is separated, and motor driving by the "two-phase method" is performed using the switching elements Q3 to Q6 of the phase B and the phase C. Then, driving of the motor M may be continued even when the switching element Q1 is destroyed due to the surge voltage.

Figure 6:
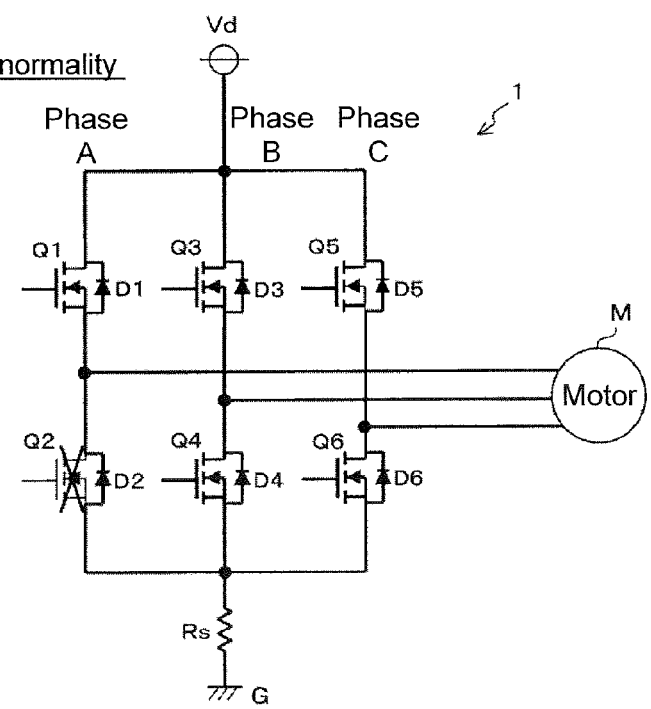
FIG. 6 is a diagram showing the state of the inverter circuit in a case where an incomplete off failure occurs at the phase A lower stage.
Figure 17:
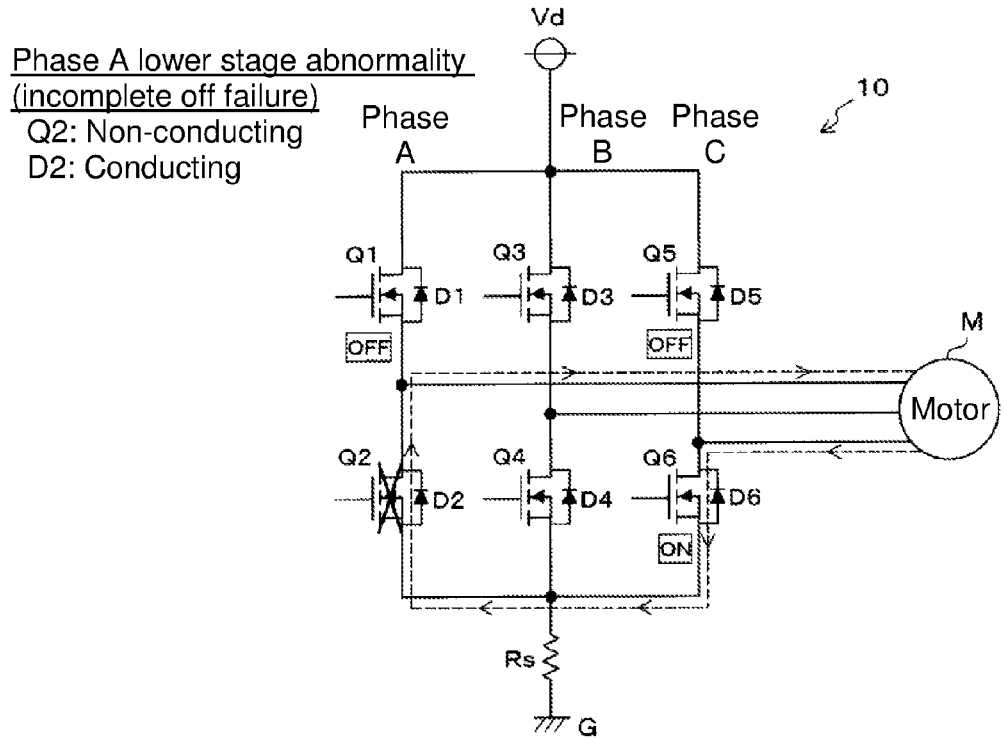
FIG. 17 is a diagram showing a path of a regenerative current in a case where an incomplete off failure occurs at a switching element of the phase A lower stage.
Figure 18:
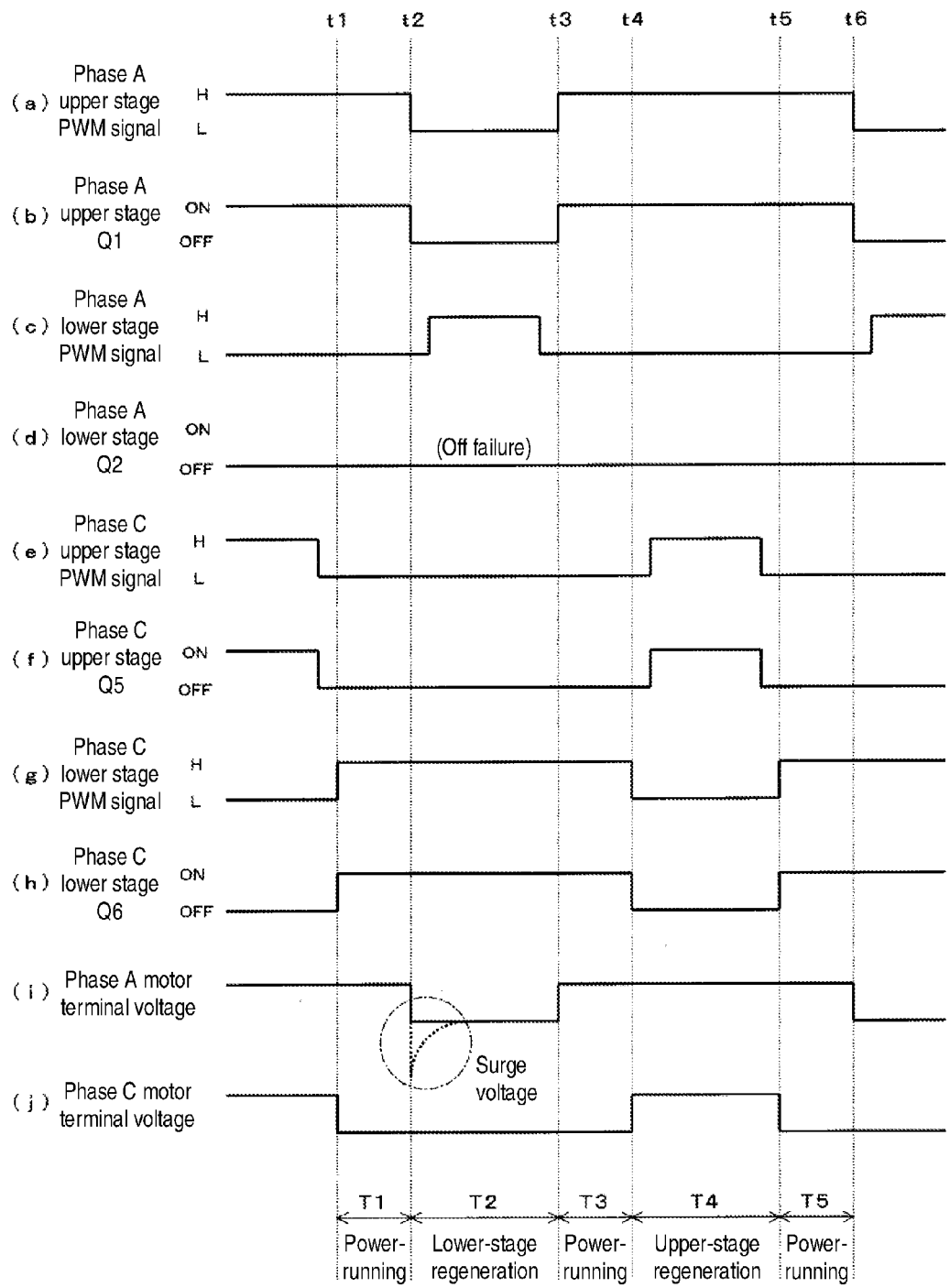
FIG. 18 is a time chart in a case where a surge occurs in a motor terminal voltage of the phase A in the state in FIG. 16.

FIG. 6 shows the state of the inverter circuit 1 in a case where an "incomplete off failure" occurs at the phase A lower stage. As has been described with reference to FIG. 17, in this case, only the switching element Q2 is in the abnormal (non-conducting) state and the diode D2 is normal, and thus, a regenerative current flows through the inverter circuit 1 at the time of lower-stage regeneration. Accordingly, there is no occurrence of the surge voltage shown in FIG. 7(i), and there is no risk of the switching element Q1 being destroyed.

Accordingly, in the case shown in FIG. 6, the switching element Q1 of the phase A upper stage, which is paired with the switching element Q2 of the phase A lower stage where a failure has occurred, is not maintained in the off state, and the on/off control is normally performed. Specifically, as shown in FIG. 7(a), the PWM signal of the phase A upper stage is changed to "H" as shown by the dashed line and the switching element Q1 is switched on as shown by the dashed line in FIG. 7(b) at the timing of switching from the lower-stage regeneration state to the power-running state (time t3). Application of the PWM signal to the switching element Q1 is continued thereafter, and the on/off control is performed for the switching element Q1. On the other hand, with respect to the switching elements Q3 to Q6 of the phase B and the phase C where a failure has not occurred, the on/off control by the PWM signals is continued. Accordingly, in FIG. 6, only the switching element Q2 of the phase A lower stage where a failure has occurred is separated, and motor driving by the "quasi three-phase method" is performed using the switching element Q1 of the phase A upper stage, which is paired with the switching element Q2, and the switching elements Q3 to Q6 of the phase B and the phase C. Driving of the motor M may thus be continued while suppressing the ripple components in the motor current.

As described above, according to one or more embodiments of the disclosure, in the case where an off failure which has occurred at one of the phases is the "complete off failure" (FIGS. 2 and 5), the whole of the faulty phase is separated, and driving by the "two-phase method" using the switching elements of the normal two phases is performed. Also, in the case where an off failure which has occurred at one of the phases is the "incomplete off failure" (FIGS. 3 and 6), only the faulty switching element is separated, and driving by the "quasi three-phase method" using the switching element which is paired with the faulty switching element and the switching elements of the normal two phases is performed. In this manner, by selecting a driving method according to the type of the off failure of a switching element, the motor M may be continuously driven under appropriate control.

Figure 8:
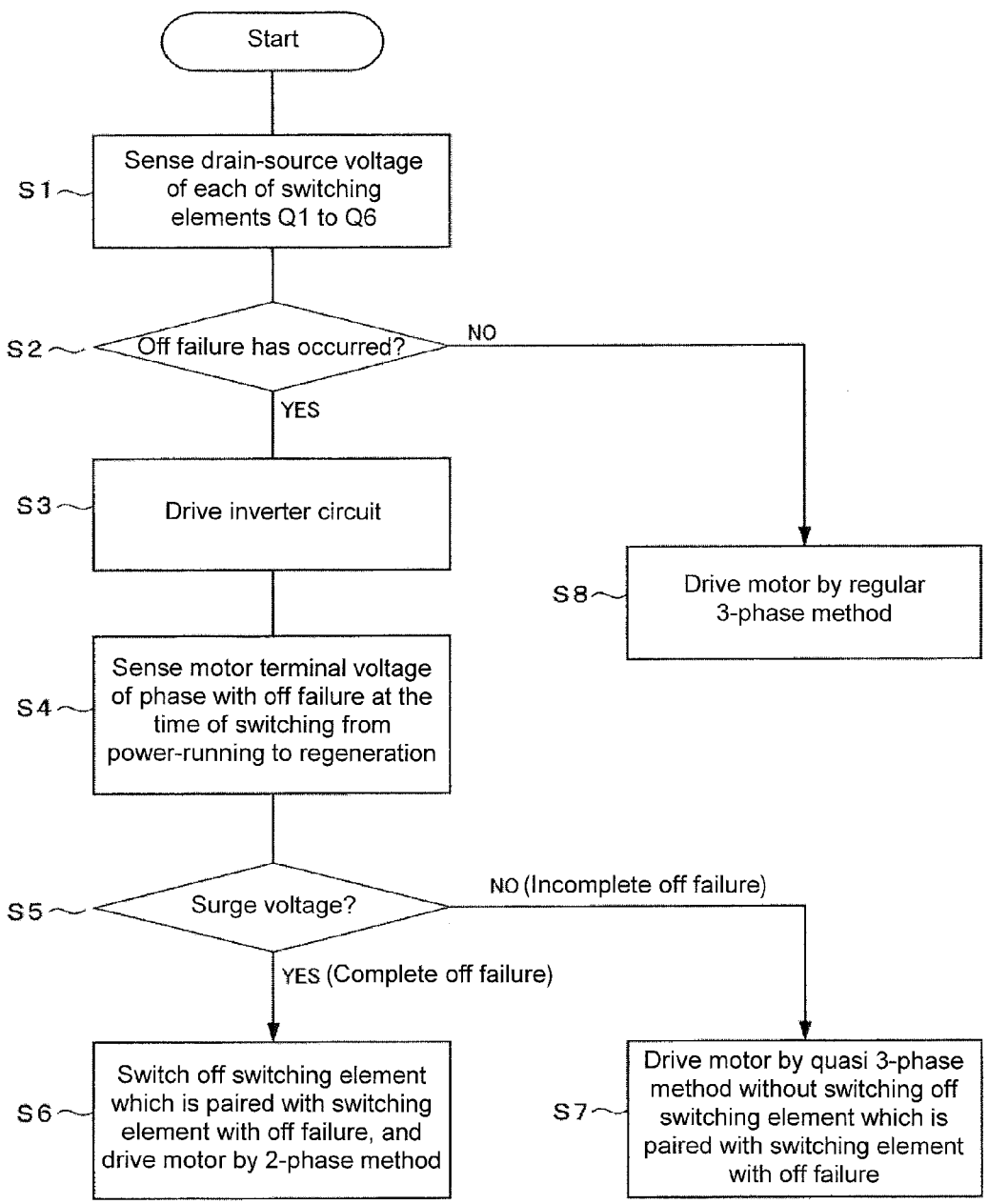
FIG. 8 is a flow chart showing a procedure for failure detection.

FIG. 8 is a flow chart showing a procedure for detecting a failure. Each step of the flow chart is performed by a microcomputer configuring the controller 3.

Figure 9:
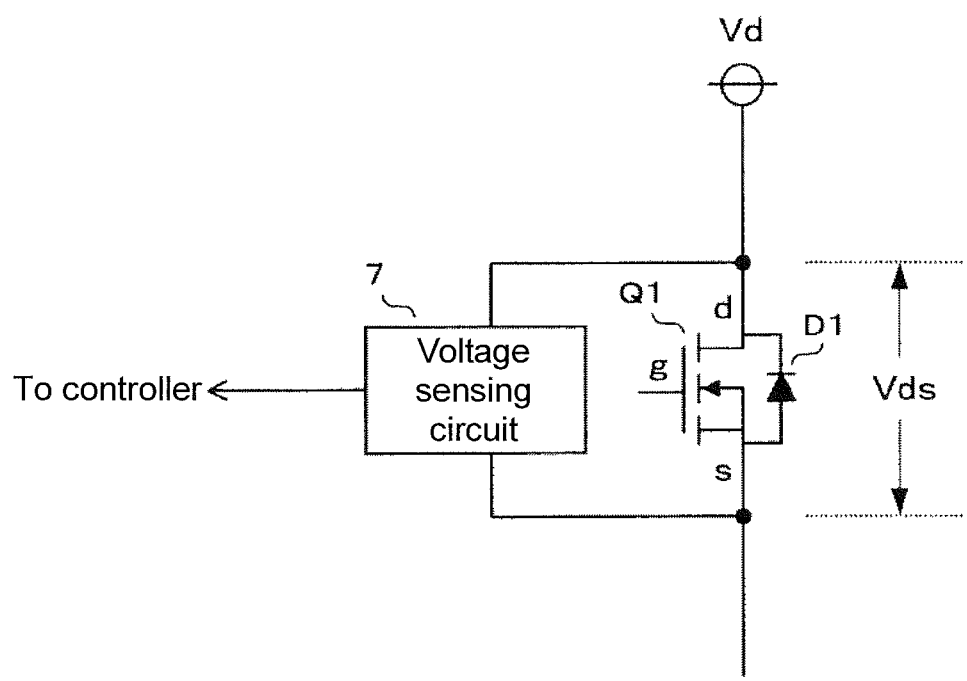
FIG. 9 is an example of a circuit for detecting voltage across both ends of a switching element.
Figure 10:
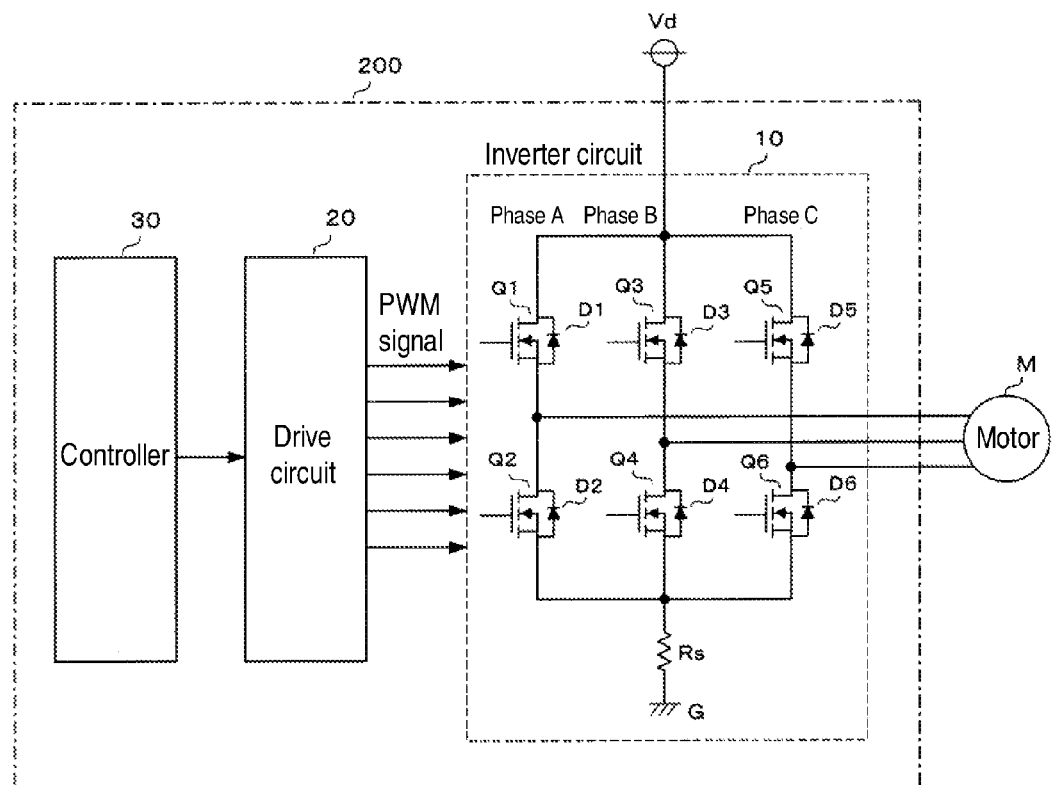
FIG. 10 is a circuit diagram of a conventional motor driving device.
Figure 12A:
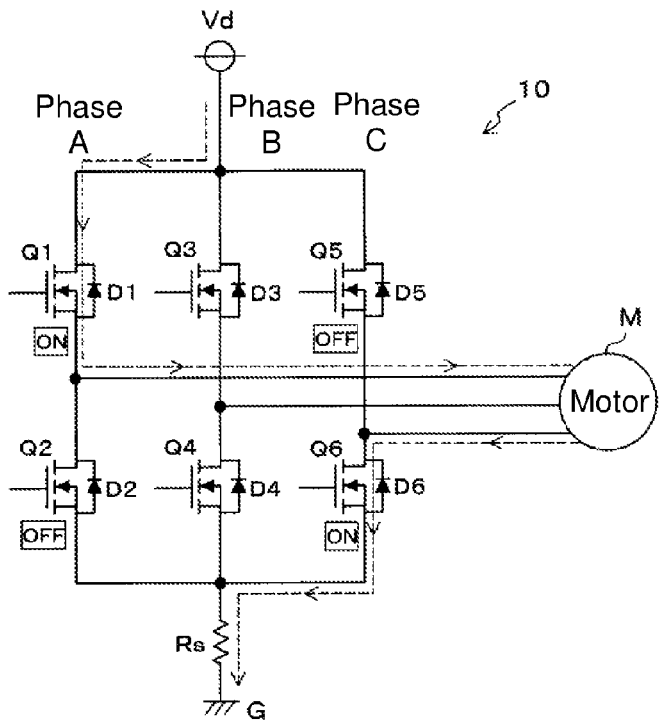
FIG. 12A is a diagram showing a current path of the inverter circuit in a power-running state.
Figure 12B:
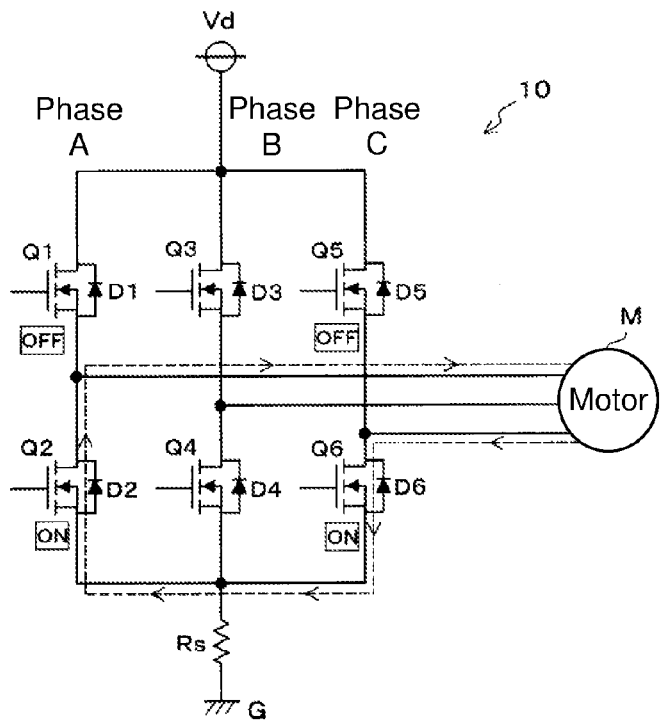
FIG. 12B is a diagram showing a current path of the inverter circuit in a lower-stage regeneration state.
Figure 12C:
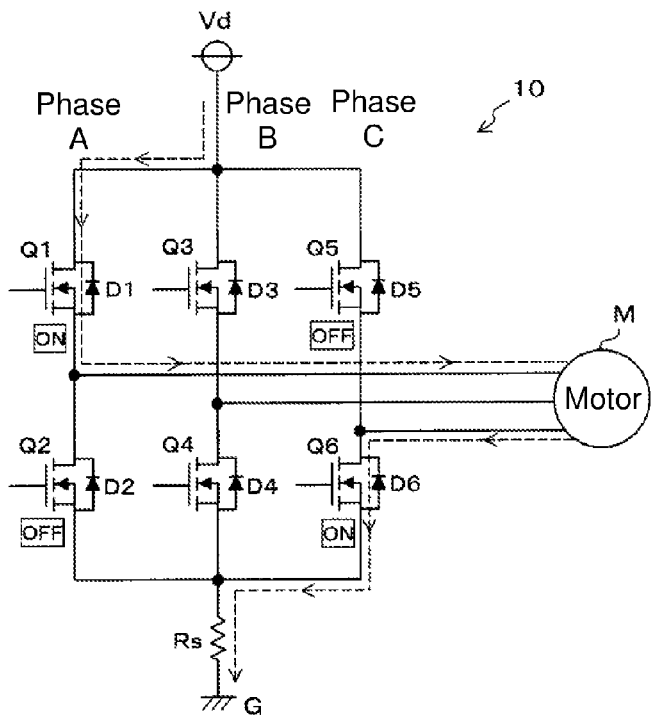
FIG. 12C is a diagram showing a current path of the inverter circuit in the power-running state.
Figure 12D:
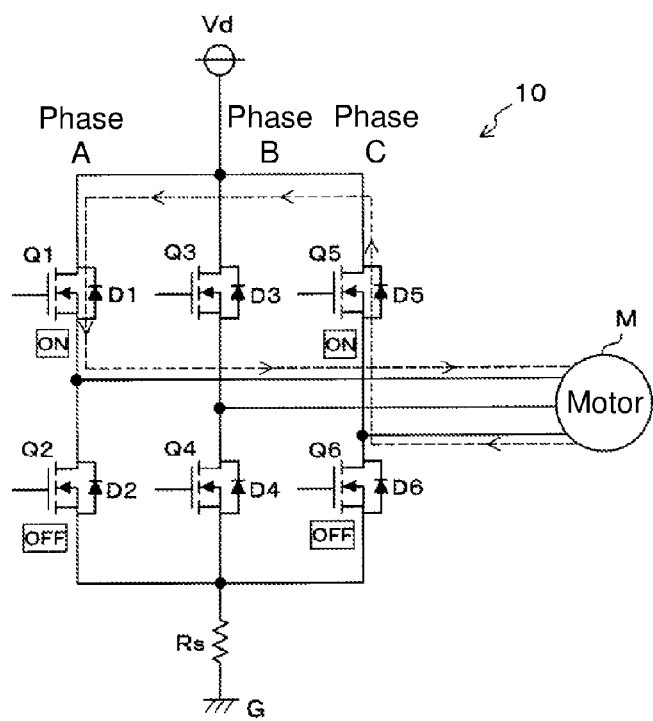
FIG. 12D is a diagram showing a current path of the inverter circuit in an upper-stage regeneration state.

In step S1, the voltage between the drain and the source of each of the switching elements Q1 to Q6 of the inverter circuit 1 is sensed. Although not shown in FIG. 1, the voltage sensing circuits 7 are provided at both ends of the switching elements Q1 to Q6, as shown in FIG. 9. Although only the voltage sensing circuit 7 provided to the switching element Q1 is shown in FIG. 9, the same voltage sensing circuits 7 are also provided to other switching elements Q2 to Q6. Voltage Vds between the drain and the source of each of the switching elements Q1 to Q6 is sensed by this voltage sensing circuit 7. The voltage sensed by the voltage sensing circuit 7 is input to the controller 3. The voltage sensing circuit 7 is an example of a "second voltage sensing unit" of the present invention.

To sense the voltage Vds between the drain and the source, on signals (H-level signals) are applied to each of the gates g of the switching elements Q1 to Q6 while shifting the timing. Then, the voltage Vds between the drain and the source of each of the switching elements Q1 to Q6 is sequentially sensed by the voltage sensing circuit 7 in a state where the on signals are applied, that is, in a state where on control is being performed on the switching elements by the controller 3. At this time, if an off failure has not occurred in a switching element, this switching element is in a conducting (on) state due to the on signal, and there is only low voltage between the drain and the source. On the other hand, if an off failure has occurred in a switching element, this switching element is in a non-conducting (off) state in spite of the application of the on signal, and there is high voltage between the drain and the source. Accordingly, if the voltage value sensed by the voltage sensing circuit 7 is equal to or greater than a predetermined value, occurrence of an off failure in a switching element, Q1 to Q6, may be determined.

In step S2, the failure detector 33 determines presence/absence of an off failure at each of the switching elements Q1 to Q6 based on the voltage Vds between the drain and the source sensed in step S1. As a result, if an off failure has occurred, the faulty switching element, and the phase and the arm where the failure has occurred are identified. If, according to the result of the determination, there is no occurrence of an off failure (step S2: No), the process proceeds to step S8, and the motor M is driven by a regular three-phase method. On the other hand, if an off failure has occurred (step S2: Yes), the process proceeds to step S3.

In step S3, the inverter circuit 1 is driven by outputting PWM signals from the drive circuit 2 and performing on/off control of the switching elements Q1 to Q6.

In step S4, the motor terminal voltage (Va, Vb, or Vc in FIG. 1) of the phase where the off failure has occurred at the time of switching of the inverter circuit 1 from the power-running state to the regeneration state is sensed by the voltage sensing circuit 4, 5, or 6. For example, in the cases shown in FIGS. 2 and 3, there is an occurrence of the off failure at the switching element Q5 at the upper stage of the phase C, and thus, the motor terminal voltage Vc (FIG. 4(j)) of the phase C at the time of switching from the power-running state to the upper-stage regeneration state (time t4 in FIG. 4) is sensed by the voltage sensing circuit 6. Also, in the cases shown in FIGS. 5 and 6, there is an occurrence of the off failure at the switching element Q2 at the lower stage of the phase A, and thus, the motor terminal voltage Va (FIG. 7(i)) of the phase A at the time of switching from the power-running state to the lower-stage regeneration state (time t2 in FIG. 7) is sensed by the voltage sensing circuit 4.

In step S5, whether the motor terminal voltage sensed in step S4 is surge voltage that exceeds threshold voltage or not is determined. In the cases shown in FIGS. 2 and 5 (a complete off failure), the switching element and the diode are both abnormal (non-conducting) and a regenerative current would not flow, and thus, surge voltage appears in the motor terminal voltage, as shown in FIGS. 4(j) and 7(i). On the other hand, in the cases shown in FIGS. 3 and 6 (an incomplete off failure), a regenerative current flows via a normal diode, and thus, surge voltage does not appear in the motor terminal voltage.

Thus, if, according to the result of determination in step S5, the motor terminal voltage is surge voltage (step S5: Yes), it is determined that a complete off failure has occurred, and the process proceeds to step S6 and motor driving is shifted to the two-phase method. That is, a switching element which is paired with the switching element where the off failure has occurred is maintained in the off state and the whole of the faulty phase is separated, and driving of the motor M is continued by the switching elements of the remaining two phases.

On the other hand, if, according to the result of determination in step S5, the motor terminal voltage is not surge voltage (step S5: No), it is determined that an incomplete off failure has occurred, and the process proceeds to step S7 and motor driving is shifted to the quasi three-phase method. That is, a switching element which is paired with the switching element where the off failure has occurred is not put into the off state, and driving of the motor M is continued by this switching element and the switching elements of the remaining two phases.

Additionally, steps S4 and S5 may be repeated several times, and the number of times the sensed motor terminal voltage is determined to be the surge voltage may be counted, and an occurrence of a complete off failure may be determined when the number of times has reached a predetermined continuous number of times.

Also, when a failure is detected in step S2 or S5, the controller 3 may output an alarm for notifying of the failure and cause a lamp to turn on based on the alarm or cause a display to display the failure.

In addition to an illustrative embodiment, one or more embodiments of the disclosure may adopt various embodiments as described below.

In an illustrative embodiment, FETs having the parasitic diodes D1 to D6 are used as the switching elements Q1 to Q6 of the inverter circuit 1, but the disclosure is not restricted thereto. For example, transistors may be used instead of the FETs, and a diode in the opposite direction with respect to the power source Vd may be connected in parallel to each transistor. Also, instead of the FET and the transistor, an IGBT (Insulated Gate Bipolar Transistor) or the like may be used as the switching element.

In an illustrative embodiment, n-channel MOS-FETs are used as the switching elements Q1 to Q6 of the inverter circuit 1, but p-channel MOS-FETs may be used instead.

In an illustrative embodiment, the drive circuit 2 is provided separately from the controller 3, but the drive circuit 2 may be incorporated in the controller 3.

In an illustrative embodiment, a three-phase motor is cited as an example of the motor M, but the disclosure may also be applied to a device which drives a polyphase motor having four or more phases. Also, in one or more embodiments of the disclosure, a brushless motor is cited as an example of the motor M, but the disclosure may also be applied to a device which drives other motors.

In an illustrative embodiment, an example is cited where the present invention is applied to a motor driving device used for an electric power steering device of a vehicle, but the disclosure may also be applied to other motor driving devices. Moreover, in an illustrative embodiment, the motor M is cited as an example of the load, but the disclosure may also be applied to a device which drives a load other than the motor.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A load driving device comprising:
an inverter circuit including a pair of upper and lower arms provided to each phase of three or more multiple phases, where a switching element is provided to each of the upper arm and the lower arm of each phase; and
a controller configured to control each of the switching elements to repeatedly turn on and off,
wherein a diode is connected in parallel to each of the switching elements in an opposite direction with respect to a power source, and
wherein a current is supplied to a load from the power source via the inverter circuit based on an on state and off state of the each switching element,
wherein the load driving device further comprises:
a failure detection unit configured to detect a failure of at least one of the switching elements corresponding to a faulty switching element, and a failure of the diode that is connected in parallel to the faulty switching element, and
wherein the controller:
performs, when the failure detection unit detects the failure according to which the faulty switching element provided to one of the upper and lower arms of a certain phase is not conducting, but does not detect the failure according to which the diode that is connected in parallel to the faulty switching element is not conducting in a forward direction, control for each switching element of other phases and control for a switching element which is paired with the faulty switching element of the certain phase to repeatedly turn on and off, and
maintains, when the failure detection unit detects the failure according to which the faulty switching element provided to the one of the upper and lower arms of the certain phase is not conducting, and detects the failure according to which the diode that is connected in parallel to the faulty switching element is not conducting, a switching element of the certain phase, which is paired with the faulty switching element, in an off state, and performs control for each switching element of other phases to repeatedly turn on and off.

2. The load driving device according to claim 1, further comprising:
a first voltage sensing unit configured to sense terminal voltage of the load,
wherein the failure detection unit determines whether the terminal voltage sensed by the first voltage sensing unit at a timing of switching of the inverter circuit from a power-running state to a regeneration state is surge voltage exceeding threshold voltage or not, and in a case where the terminal voltage is the surge voltage, determines that the switching element provided to the one of the upper and lower arms and the diode that is connected in parallel to the switching element provided to the one of the upper and lower arms are both faulty.

3. The load driving device according to claim 2, wherein, in a case where a number of times of determination that the terminal voltage of the load sensed at the timing is the surge voltage reaches a predetermined continuous number of times, the failure detection unit determines that the switching element provided to the one of the upper and lower arms and the diode that is connected in parallel to the switching element provided to the one of the upper and lower arms are both faulty.

4. The load driving device according to claim 1, further comprising:
  a second voltage sensing unit configured to detect voltage across both ends of the switching element provided to the one of the upper and lower arms,
  wherein, in a case where voltage across both ends of the switching element sensed by the second voltage sensing unit in a state where on control is being performed by the controller for the switching element sensed by the second voltage sensing unit is a predetermined value or higher, the failure detection unit determines that the switching element is faulty.

* * * * *